US008937815B2

(12) United States Patent
De Jong et al.

(10) Patent No.: US 8,937,815 B2
(45) Date of Patent: Jan. 20, 2015

(54) MULTIFUNCTION MONITOR SUPPORT (71) Applicant: Volcano Corporation, San Diego, CA (US)

(72) Inventors: Duane De Jong, Elk Grove, CA (US); Aaron J. Cheline, Sacramento, CA (US)

(73) Assignee: Volcano Corporation, San Diego, CA (US)

( * ) Notice: Subject to any disclaimer, the term of this patent is extended or adjusted under 35 U.S.C. 154(b) by 0 days.

(21) Appl. No.: 13/860,236

(22) Filed: Apr. 10, 2013

(65) Prior Publication Data

US 2013/0271939 A1 Oct. 17, 2013

Related U.S. Application Data (60) Provisional application No. 61/622,937, filed on Apr. 11, 2012.

(51) Int. Cl.
F16M 11/20 (2006.01)
F16M 11/42 (2006.01)
F16M 11/10 (2006.01)
F16M 11/24 (2006.01)

(52) U.S. Cl.
CPC .............. *F16M 11/20* (2013.01); *F16M 11/42* (2013.01); *F16M 2200/063* (2013.01); *F16M 11/2014* (2013.01); *F16M 11/10* (2013.01); *F16M 2200/044* (2013.01); *F16M 11/2092* (2013.01); *F16M 11/24* (2013.01)
USPC ......................................... 361/809

(58) Field of Classification Search
CPC ....... F16M 11/20; F16M 11/10; F16M 11/02; F16M 11/04; F16M 11/24; F16M 11/12
USPC .................................. 361/809, 807, 600, 211
See application file for complete search history.

(56) References Cited

U.S. PATENT DOCUMENTS

| 5,743,503 | A  | * | 4/1998 | Voeller et al. .............. 248/284.1 |
| 6,015,120 | A  |   | 1/2000 | Sweere et al. |
| 7,971,840 | B2 |   | 7/2011 | Hirschhorn |
| 7,997,211 | B2 |   | 8/2011 | Peterson et al. |

(Continued)

OTHER PUBLICATIONS

International Searching Authority/KIPO, "Notification of Transmittal of the International Search Report and the Written Opinion of the International Searching Authority, or the Declaration,", for PCT/US2013/035970, mailed Jul. 29, 2013, 13 pages.

*Primary Examiner* — Timothy Thompson
*Assistant Examiner* — Charles Pizzuto
(74) *Attorney, Agent, or Firm* — Haynes and Boone, LLP (57) ABSTRACT A monitor support for use in multiple configurations including a base portion; a monitor; and a multilink arm coupling the monitor to the base portion is provided. The multilink arm includes a first beam coupled to the base portion by a first pivot; a second beam coupled to the base portion by a second pivot; the first and second beams move in parallel as they rotate about the first and second pivots. The multilink arm may include a connector coupling the monitor to the arm, having a connector axis for rotating the monitor by approximately 180° about the connector axis. Also provided is a cart for carrying instrumentation including a monitor support as above, and a method for using it. The cart includes a bottom portion for holding a desktop instrument, the bottom portion including wheels for rolling the cart; and a top portion for holding the monitor support.

11 Claims, 11 Drawing Sheets

(56) References Cited

U.S. PATENT DOCUMENTS

| | | |
|---|---|---|
| 8,109,527 B2 | 2/2012 | Bustle et al. |
| 2003/0165373 A1* | 9/2003 | Felder et al. ............. 414/331.07 |
| 2006/0125356 A1* | 6/2006 | Meek et al. ................... 312/215 |
| 2008/0029670 A1 | 2/2008 | Hung |
| 2008/0251661 A1* | 10/2008 | Rossini ...................... 248/176.1 |
| 2012/0039059 A1* | 2/2012 | Yu et al. ......................... 361/809 |
| 2012/0320513 A1* | 12/2012 | Truong et al. ............ 361/679.22 |
| 2013/0193173 A1* | 8/2013 | Bonito et al. ................. 224/274 |

\* cited by examiner

MULTIFUNCTION MONITOR SUPPORT

CROSS REFERENCE TO RELATED APPLICATIONS

The present application claims priority to and the benefit of U.S. Provisional Patent Application No. 61/622,937, filed Apr. 11, 2012, which is hereby incorporated by reference herein in its entirety.

BACKGROUND

Embodiments described herein relate to the field of medical devices. More particularly, embodiments described herein are related to the field of holders for monitors used in medical devices.

In the field of medical devices multipurpose carts have been extensively used to move complex medical instrumentation from one patient location to another. In many instances, the medical instrumentation carried by the multipurpose carts includes devices having a graphic user interface (GUI) such as monitors, touch-screen monitors, and other types of interfaces such as keyboards. Typically, the monitors are large and heavy, thereby occupying a large space in the cart and creating a stability issue while the cart is being moved. Furthermore, the size of the monitor precludes easy accessibility by the user to a Patient Interface Module (PIM) that may be placed within the cart. Moreover, the bulky and extended form factor of a cart including a medical instrument having a monitor usually precludes the shipping and transportation of the medical device as a single piece. In many instances, the shipping of the instrument is performed with the monitor as a separate unit, to avoid damage.

Therefore, there is a need for devices and means to hold large monitors and screens in medical instruments included in roll-around carts.

According to embodiments disclosed herein, a monitor support for use in multiple configurations includes a base portion; a monitor; and a multi-link arm coupling the monitor to the base portion. The multi-link arm may include a first beam coupled to the base portion by a first pivot; a second beam coupled to the base portion by a second pivot; the first beam and the second beam allowed to have a parallel motion relative to each other as the first beam rotates about the first pivot and the second beam rotates about the second pivot. In some embodiments, the multi-link arm may further include a connector coupling the monitor to the multi-link arm, the connector having a connector axis, the connector enabling a rotation of the monitor by approximately 180° about the connector axis.

According to some embodiments disclosed herein, a cart for carrying instrumentation including a monitor support includes a bottom portion for holding a desktop instrumentation, the bottom portion including wheels for rolling the cart; and a top portion for holding the monitor support. In some embodiments the monitor support includes a base portion; a monitor; and a multi-link arm coupling the monitor to the base portion. The multi-link arm may include a first beam coupled to the base portion by a first pivot; a second beam coupled to the base portion by a second pivot, the first beam and the second beam allowed to have a parallel motion relative to each other as the first beam rotates about the first pivot and the second beam rotates about the second pivot. The multi-link arm may further include a connector coupling the monitor to the multi-link arm, the connector having a connector axis, the connector enabling a rotation of the monitor by approximately 180° about the connector axis.

According to embodiments disclosed herein, a method for using a monitor having a display for instrumentation carried in a cart may include adjusting the orientation of a multi-link arm in a monitor support, the multi-link arm coupling the monitor to a base portion. The method may further include rotating the monitor about a connector axis in a connector, the connector coupling the monitor to the multi-link arm; wherein the connector remains in a horizontal position while adjusting the multi-link arm.

These and other embodiments of the present invention will be described in further detail below with reference to the following drawings.

BRIEF DESCRIPTION OF THE DRAWINGS

In the figures, elements having the same reference number have the same or similar functions.

DETAILED DESCRIPTION

A monitor support consistent with embodiments disclosed herein supports and holds a monitor in multiple positions.

In some embodiments, a roll-around cart to carry a medical instrument may include a monitor having touch screen functionality. To make full use of the touch-screen functionality it is desirable to orient the monitor in a semi-horizontal or tablet position. For example, in a tablet position the monitor is placed such that an active screen of the touch screen monitor points substantially up, and is firmly secured on the bottom side, to enable active touch by the user. In addition, it may be desirable to place the monitor in a vertical orientation for visualization purposes. Further, it may be desirable to fold the monitor flat on a top surface of the cart for shipping, transporting, and storage purposes.

In some embodiments consistent with the present disclosure a monitor support is mounted to the top of a roll-around cart including a medical instrument. Some embodiments may include a monitor support mounted to a table top, where the table top is fixed, or has a lesser range of motion compared to a roll-around cart.

In some embodiments the monitor is held in a tablet orientation to support touch screen applications. This may be convenient in embodiments where the monitor support is placed in a multimodality cart.

Figure 1:
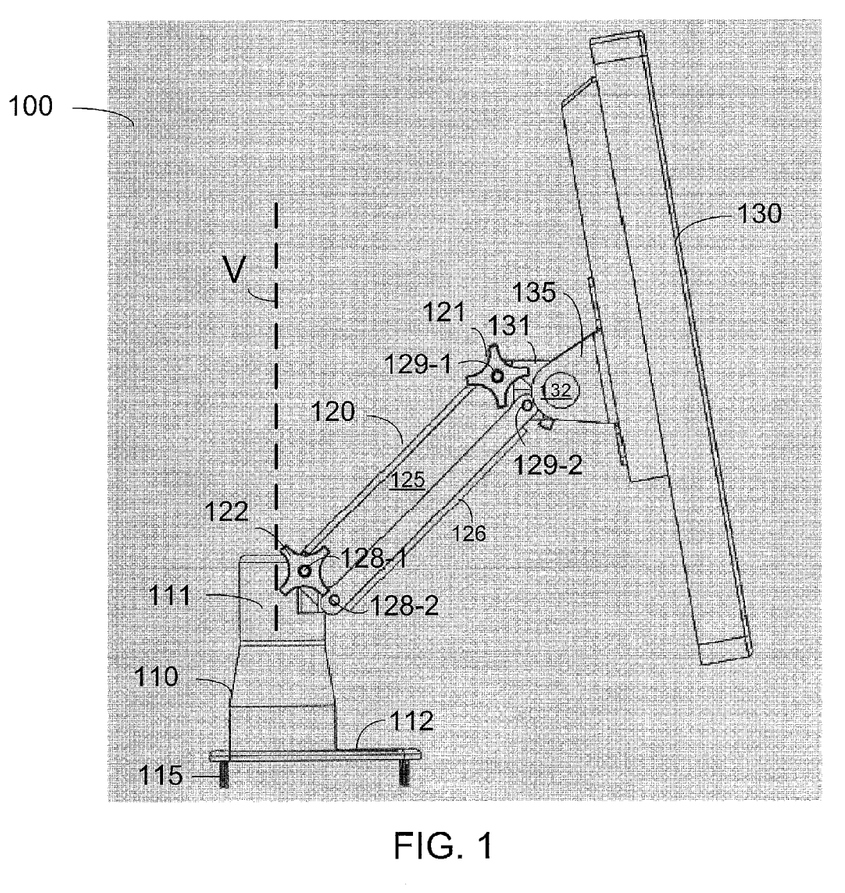
FIG. 1 illustrates a partial view of a monitor support, according to embodiments disclosed herein.

FIG. 1 illustrates a partial view of a monitor support 100, according to embodiments disclosed herein. Monitor support 100 includes a base portion 110, a multi-link arm 120, and a monitor 130. Base portion may have a top 111, and a bottom plate 112 to provide a fixture for monitor support 100. Base portion 100 defines a vertical axis V, as shown in FIG. 1. In some embodiments, bottom plate 112 is attached to a flat surface through fixing elements 115. For example, fixing elements 115 may be screws or bolts. Multi-link arm 120 may include beams 125 and 126, allowed to have a parallel motion relative to each other. Monitor 130 is coupled to multi-link arm 120 through mount 135, which rotates about axis 132. Axis 132 may be part of connector 131, according to some embodiments. Connector 131 enables the rotation of monitor 130 by an angle of about 180°, or about a half turn, about axis 132.

The configuration of monitor support 100 may be adjusted by moving or rotating base portion 110, multi-link arm 120, and monitor 130 relative to each other. In order to do this, monitor support 100 includes pivot points 128-1 and 128-2 coupling multi-link arm 120 to base portion 110. Beam 125 in multi-link arm 120 hinges on pivot point 128-1, and beam 126 in multi-link arm 120 hinges on pivot point 128-2. Thus, in some embodiments the two beams 125 and 126 in multi-link arm 120 rotate about pivot points 128-1 and 128-2, respectively, in the plane of FIG. 1. As beam 125 and 126 rotate in the plane of FIG. 1, they are displaced in parallel relative to each other. Further, some embodiments consistent with the present disclosure may include pivot points 129-1 and 129-2 coupling multi-link arm 120 to connector 131. Pivot points 129-1 and 129-2 keep connector 131 in a fixed orientation relative to bottom plate 112 as multi-link arm 120 is rotated about pivot points 128-1 and 128-2. For example, as multi-link arm 120 is rotated about pivot points 128-1 and 128-2, connector 131 remains in a horizontal position, according to some embodiments. This enables monitor 130 to be rotated about axis 132 by any desired amount, from zero to 180°. Embodiments consistent with the present disclosure may include knobs 121 and 122. Knob 122 secures multi-link arm 120 to base portion 110 in a desired position. In some embodiments, knob 122 may lock beam 125 to pivot point 128-1. Knob 121 secures multi-link arm 120 and monitor 130 in a desired position. In some embodiments, knob 121 may lock beam 125 to pivot point 129-1. Pivot points 129-1 and 129-2 may move relative to one another when multi-link arm 120 is rotated as described above. This provides a certain degree of rotation to coupler 131 in the plane of FIG. 1. To compensate for the rotation of coupler 131, the orientation of monitor 130 may be adjusted about axis 132. In some embodiments, a knob (not shown in FIG. 1) may be used to lock monitor 130 to axis 132.

Figure 2:
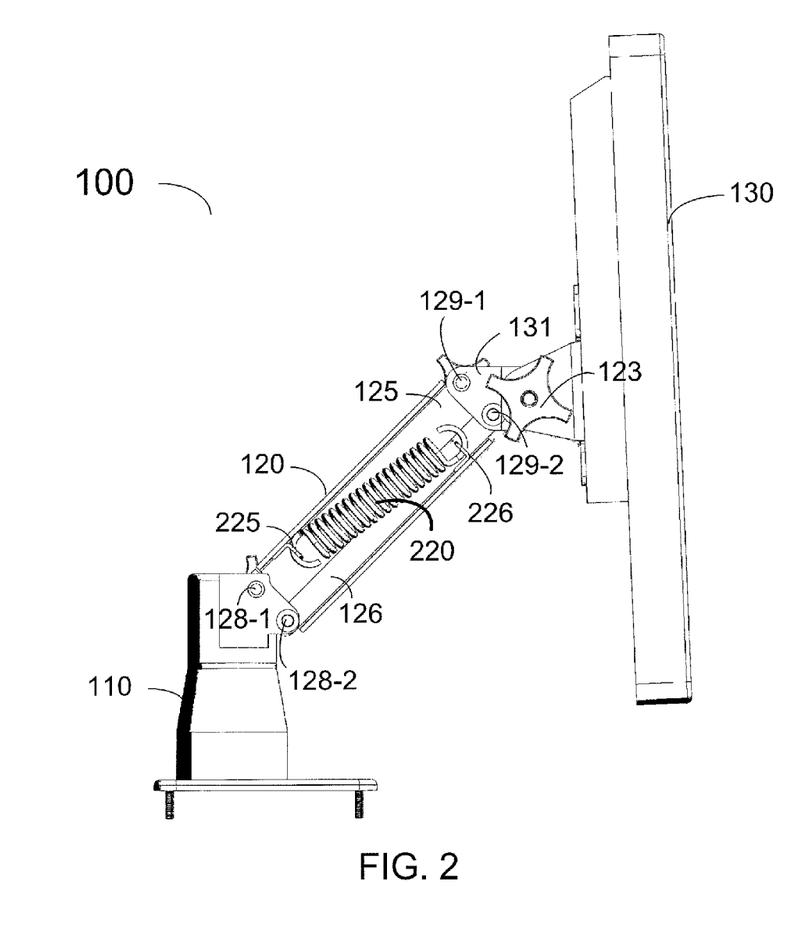
FIG. 2 illustrates a partial view of the inside of a monitor support according to embodiments disclosed herein.

FIG. 2 illustrates a partial view of the inside of monitor support 100, according to embodiments disclosed herein. According to some embodiments, monitor support 100 includes a spring 220 coupling beam 125 to beam 126. Spring 220 keeps beam 125 and 126 together and parallel as multi-link arm 120 is rotated about pivot points 128-1 and 128-2, in the plane of FIG. 2. To do this, spring 220 is coupled on one end to a tab 226 attached to beam 126. Also, spring 220 is coupled on the other end to a tab 225 attached to beam 125. Thus, as multi-link arm 120 rotates in the plane of FIG. 2, spring 220 is stretched, providing a restoring force that keeps beams 125 and 126 securely in contact with each other. In embodiments consistent with the present disclosure, knob 123 may be used to lock monitor 130 in a desired orientation, about axis 132 (cf. FIG. 1).

Figure 3A:
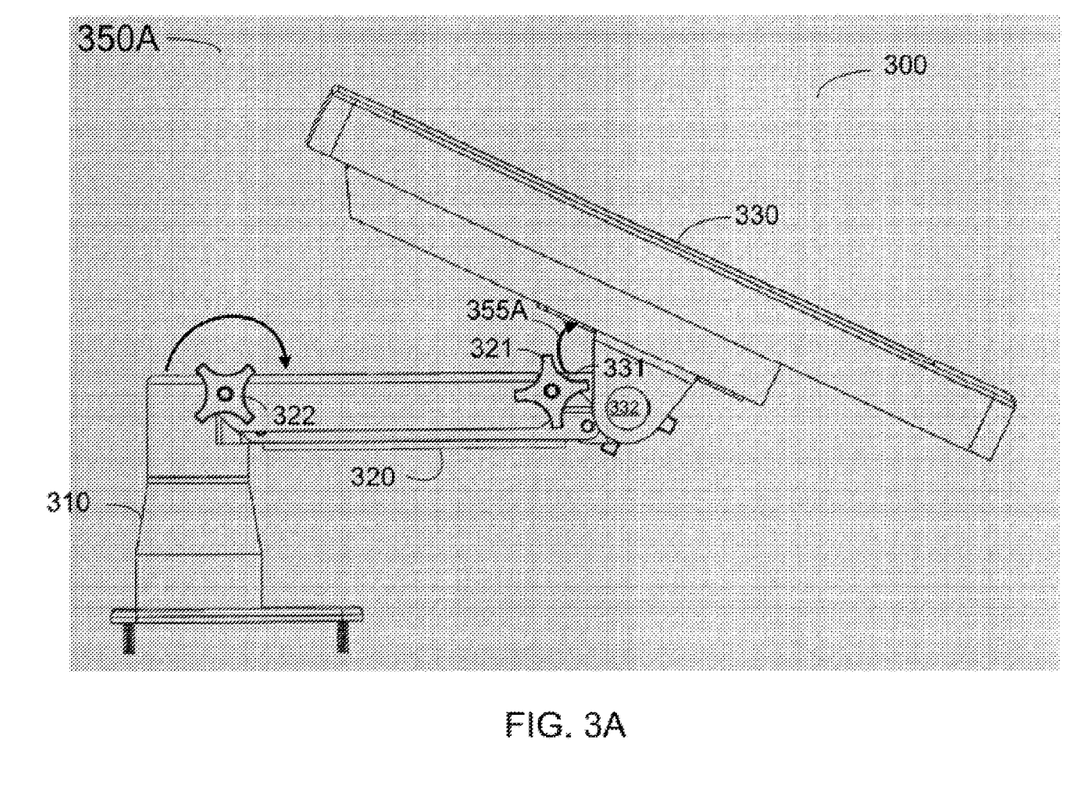
FIG. 3A illustrates a partial view of a monitor support configuration according to embodiments disclosed herein.

FIG. 3A illustrates a partial view of a configuration 350A with a monitor support 300 according to embodiments disclosed herein. Base portion 310 and multi-link arm 320 are as described in detail above in reference to base portion 110 and multi-link arm 120, respectively (cf. FIG. 1). In some embodiments, configuration 350A may be used as a tablet configuration in which monitor 330 has a touch sensitive screen, facing upwards. In such configuration, the touch sensitive screen in monitor 330 is firmly secured by base portion 310 and multi-link arm 320, so that a user may safely press on the screen. To provide a firm support in configuration 300A, knob 322 is tightened so that multi-link arm 320 rests horizontally, relative to base plate 310. Further, knob 321 is tightened so that monitor 330 is fixed in a semi-horizontal position, as shown. It is appreciated that in configuration 350A connector 331 remains in a substantially horizontal position, forming an angle 355A with monitor 330 about axis 332. Angle 355A is relatively small, as illustrated in FIG. 3A. It will be appreciated by those skilled in the art that angle 355A may be as small as desired, for example zero (0) degrees so that monitor 330 may rest flat on multi-link arm 320 when multi-link arm 320 is horizontally positioned, as in configuration 350A.

Figure 3B:
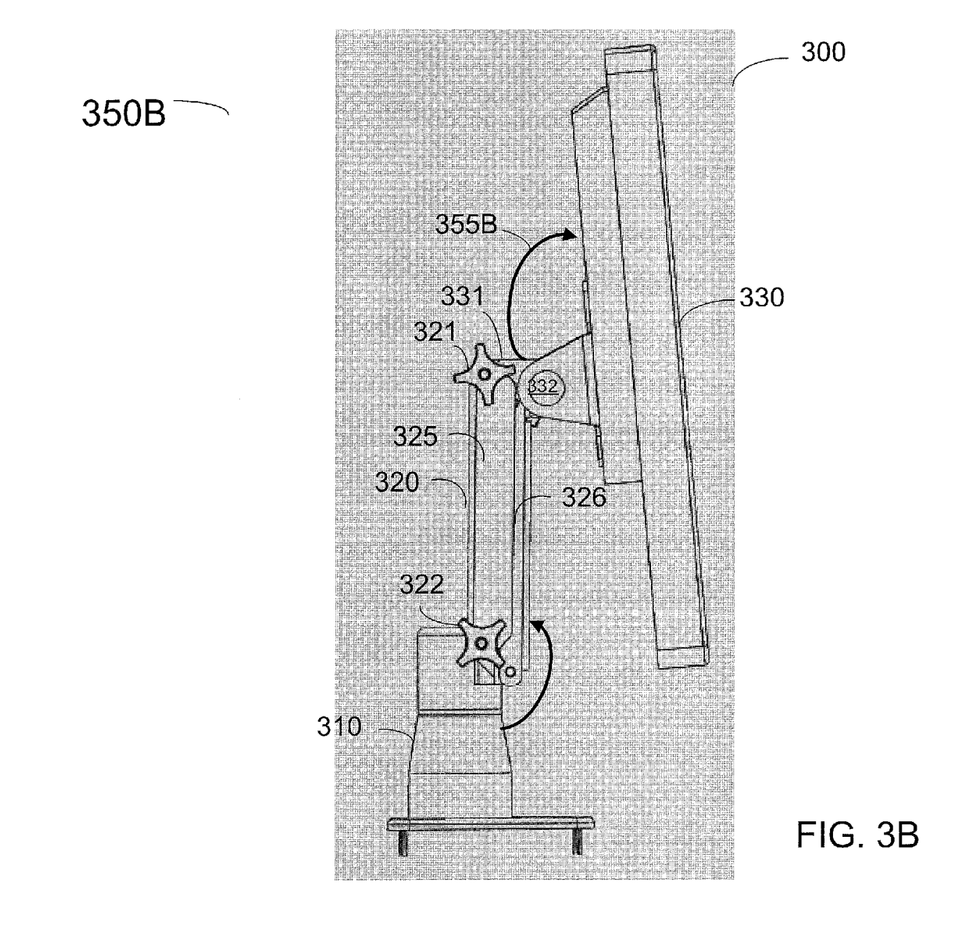
FIG. 3B illustrates a partial view of a monitor support configuration according to embodiments disclosed herein.

FIG. 3B illustrates a partial view of a configuration 350B with monitor support 300 according to embodiments disclosed herein. Base portion 310 and multi-link arm 320 are as described in detail above in reference to base portion 110 and multi-link arm 120, respectively (cf. FIG. 1). In configuration 350B, knob 322 is tightened so that multi-link arm 320 is approximately vertical, relative to base plate 310. Further, knob 321 is tightened so that monitor 330 is fixed in a substantially vertical position, as shown. It is appreciated that in configuration 350B connector 331 remains in a substantially horizontal position (cf. FIG. 3A), forming an angle 355B with monitor 330 about axis 332. Angle 355B is approximately 90°, as illustrated in FIG. 3B. It will be appreciated by those skilled in the art that angle 355B may be somewhat smaller than 90°, or somewhat larger than 90° as desired by a user looking at the screen in monitor 330. According to some embodiments, configuration 350B may adopt a vertical configuration when beam 325 and beam 326 form a 90° angle with the horizontal plane in FIG. 3B.

Figure 3C:
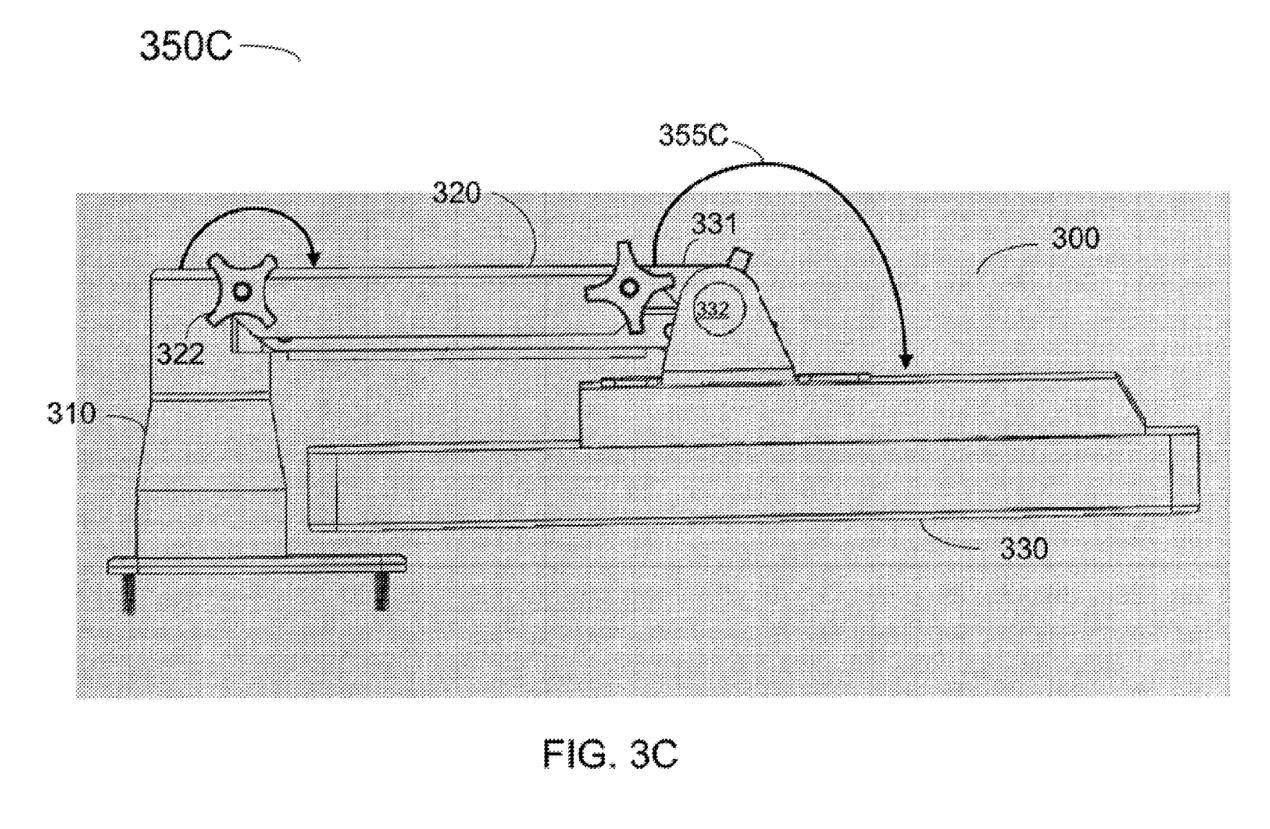
FIG. 3C illustrates a partial view of a configuration with a monitor support according to embodiments disclosed herein.

FIG. 3C illustrates a partial view of a configuration 350C with monitor support 300 according to embodiments disclosed herein. Base portion 310 and multi-link arm 320 are as described in detail above in reference to base portion 110 and multi-link arm 120, respectively (cf. FIG. 1). In configuration 350C, knob 322 is tightened so that multi-link arm 320 is horizontal relative to base plate 310. Further, knob 321 is tightened so that monitor 330 is fixed in a substantially horizontal position facing down, as shown. A configuration such as 350C where monitor support 300 folds in on itself may be used for storage, shipping, or transport of a medical instrument including monitor 330. It is appreciated that in configuration 350C connector 331 remains in a substantially horizontal position (cf. FIGS. 3A and 3B), forming an angle 355C with monitor 330 about axis 332. Angle 355C is relatively large, as illustrated in FIG. 3C. It will be appreciated by those skilled in the art that angle 355C may be as large as desired, for example up to 180°. Thus, monitor 330 may rest flat on a surface where base plate 112 is attached to, and multi-link arm 320 may then cover monitor 330 from above, as in configuration 350C.

According to embodiments disclosed herein, configuration 350C may be such that a keyboard or a second monitor may be completely covered by monitor 330 when folded down. Configurations such as 350C may be desirable for shipping and transportation of a rolling cart having a monitor support consistent with the present disclosure, attached thereon. In some embodiments, configuration 350C may be referred to as a closed configuration.

Figure 3D:
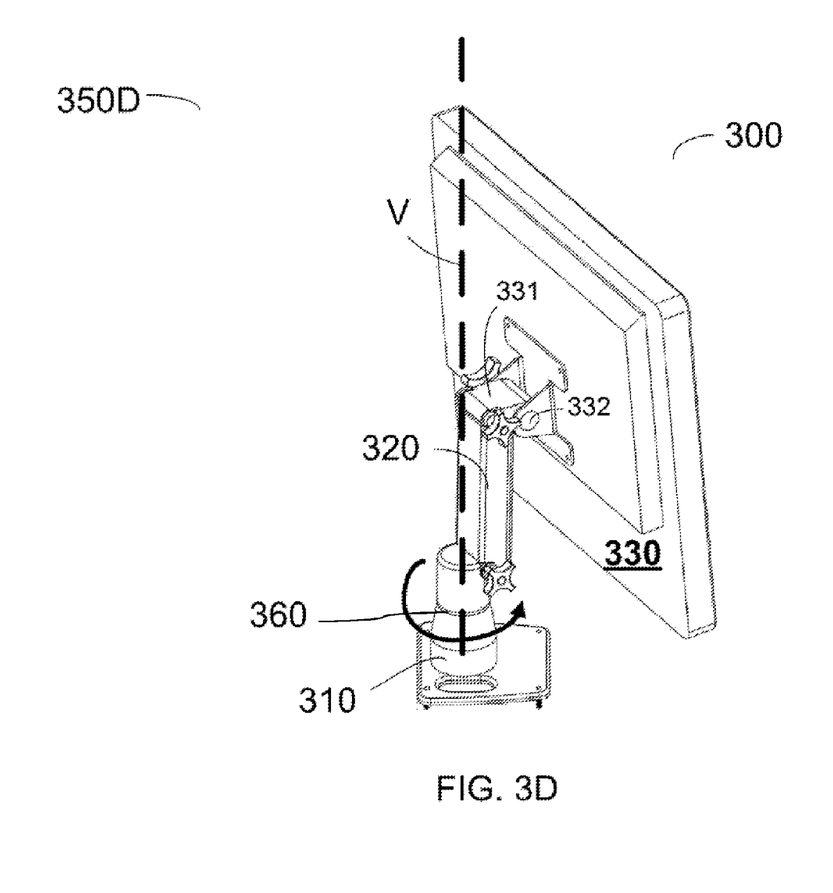
FIG. 3D illustrates a partial view of a monitor support configuration according to embodiments disclosed herein.

FIG. 3D illustrates a partial view of a configuration 350D with monitor support 300 according to embodiments disclosed herein. In some configurations, due to space limitations a cart carrying a medical instrument including monitor 330 may be oriented in a specific direction. In such configurations it may be desirable to rotate the monitor relative to the cart position, so that a user may have visual access to the monitor screen. This is illustrated in FIG. 3D. Base portion 310 and multi-link arm 320 are as described in detail above in reference to base portion 110 and multi-link arm 120, respectively (cf. FIG. 1). To enable a rotation of monitor 330 about vertical axis V in base portion 310, a pivot bolt 360 is used to hold multi-link arm 320 vertically, or in any other orientation.

Figure 4:
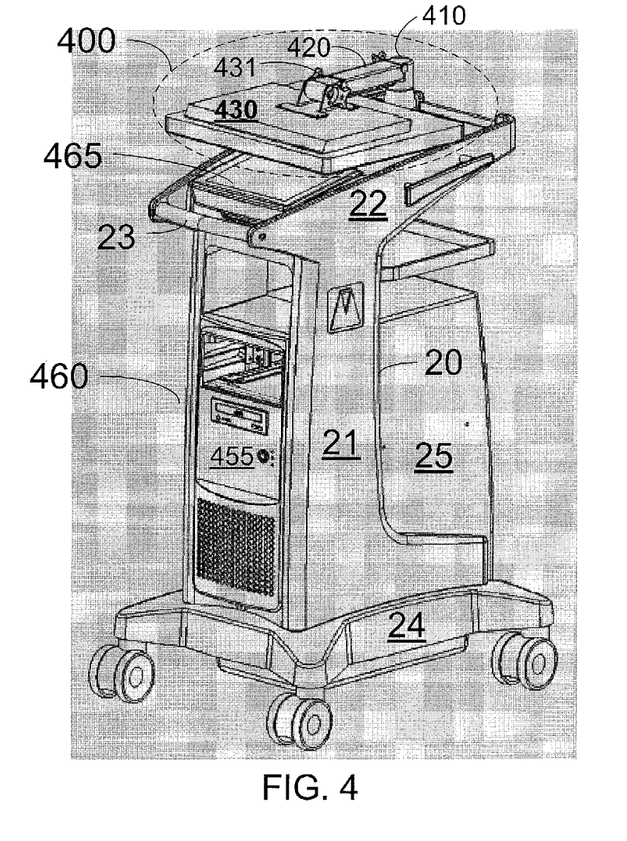
FIG. 4 illustrates a partial view of a monitor support on a rolling cart, according to embodiments disclosed herein.

FIG. 4 illustrates a partial view of a monitor support 400 on a rolling cart 460, according to embodiments disclosed herein. According to embodiments consistent with the present disclosure, cart 460 includes frame 20 formed by a vertical portion 21 joining a top platform 22 and a bottom platform 24. Bottom platform 24 includes wheels to enable rolling for cart 460. Bottom platform 24 holds the bulk of the medical instrument to be carried by cart 460. In some embodiments the instrument may be an IVUS machine. The bulk of the medical instrument typically includes a computer having a CPU unit including disk drives and other computer main frame elements. In some embodiments, the bulk of the medical instrument may be a desktop portion 455. Some embodiments of rolling cart 460 may include casing 25 to cover and protect desktop portion 455. Top platform 22 includes a handle bar 23 for pushing cart 460. Top platform 22 holds user interfacing accessories connected to the bulk of the medical instrument on bottom platform 24, such as monitor holder 400 including monitor 430.

Base portion 410, multi-link arm 420, monitor 430, and connector 431 may be as described in detail above in relation to elements 110, 120, 130, and 131 respectively. In embodiments consistent with the present disclosure, monitor support 400 may be in a configuration folded in into itself, such as configuration 350C (cf. FIG. 3C). Configuration 350C may be such that a keyboard or a second monitor 465 may be almost completely covered by monitor 430 when folded into itself. Thus, when transporting cart 460 including monitor support 400, the medical instrument is protected from accidental contact on keyboard or second monitor 465.

Figure 5A:
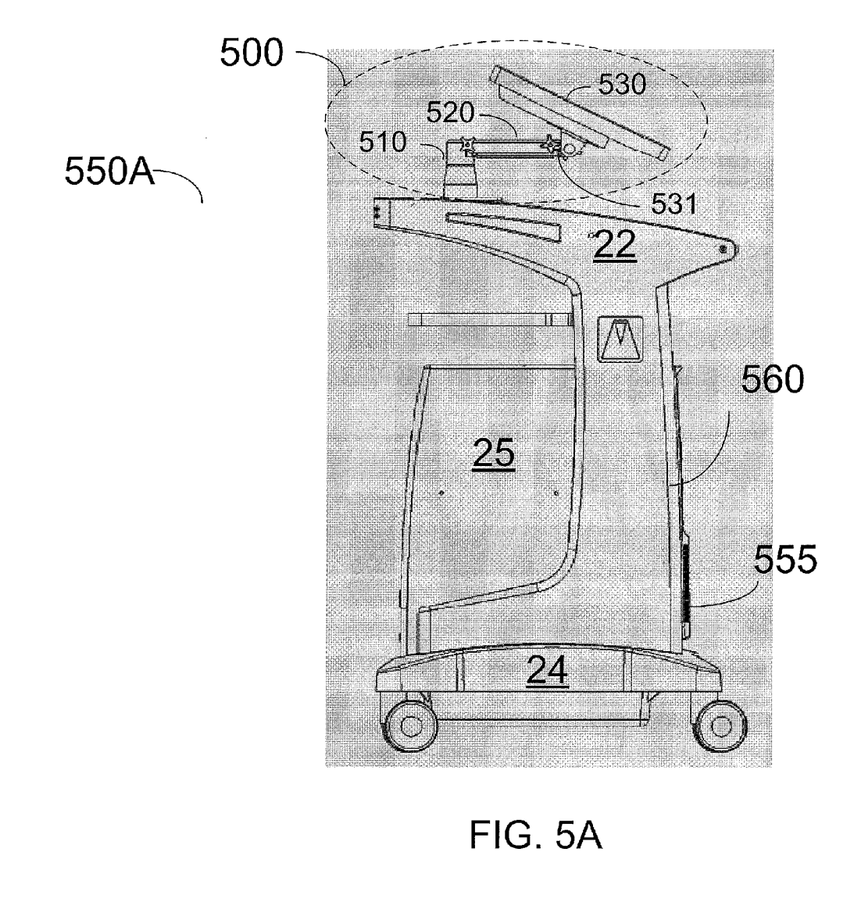
FIG. 5A illustrates a partial view of a monitor support configuration on a rolling cart, according to embodiments disclosed herein.

FIG. 5A illustrates a partial view of a configuration 550A with a monitor support 500 on a rolling cart 560, according to embodiments disclosed herein. Monitor support 500 includes base portion 510, multi-link arm 520, monitor 530, and connector 531, as described in detail in relation to elements 110, 120, 130, and 131 respectively, in FIG. 1. Rolling cart 560 may include casing 555 to cover the desktop portion of a medical instrument, as described above with relation to element 455 (cf. FIG. 4). According to embodiments consistent with the present disclosure, configuration 550A may include a tablet configuration, as in configuration 350A (cf. FIG. 3A).

Figure 5B:
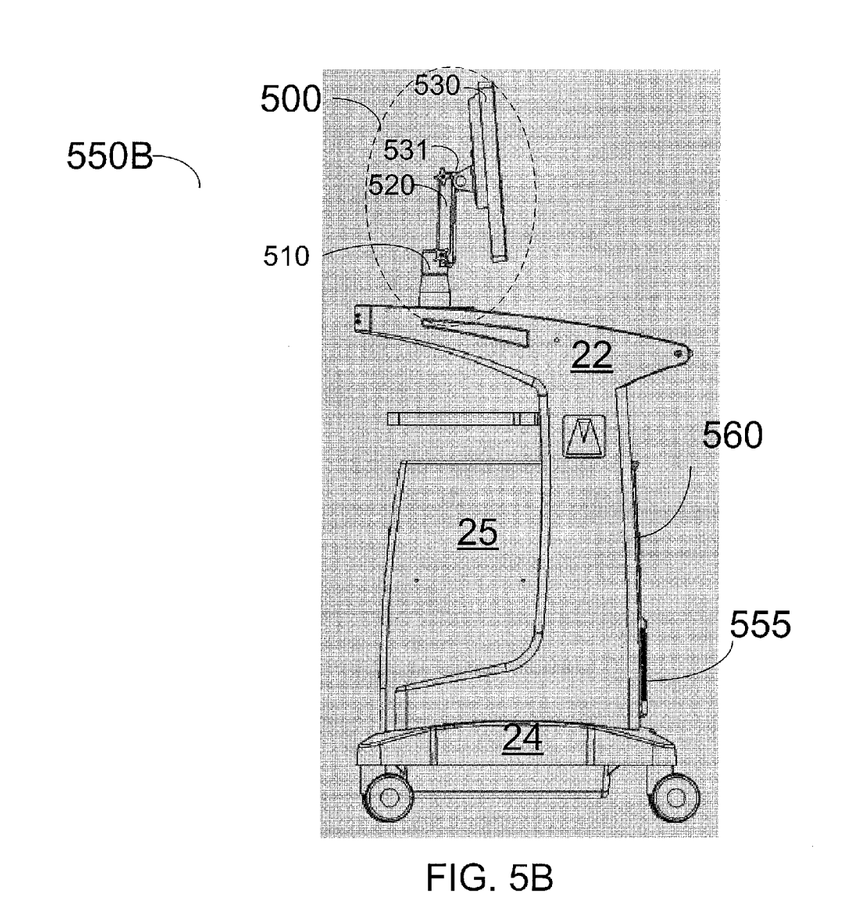
FIG. 5B illustrates a partial view of a monitor support configuration on a rolling cart, according to embodiments disclosed herein.

FIG. 5B illustrates a partial view of a configuration 550B with monitor support 500 on rolling cart 560, according to embodiments disclosed herein. Configuration 550B may include monitor support 500 as in configuration 350B, described in detail above in relation to FIG. 3B.

Figure 5C:
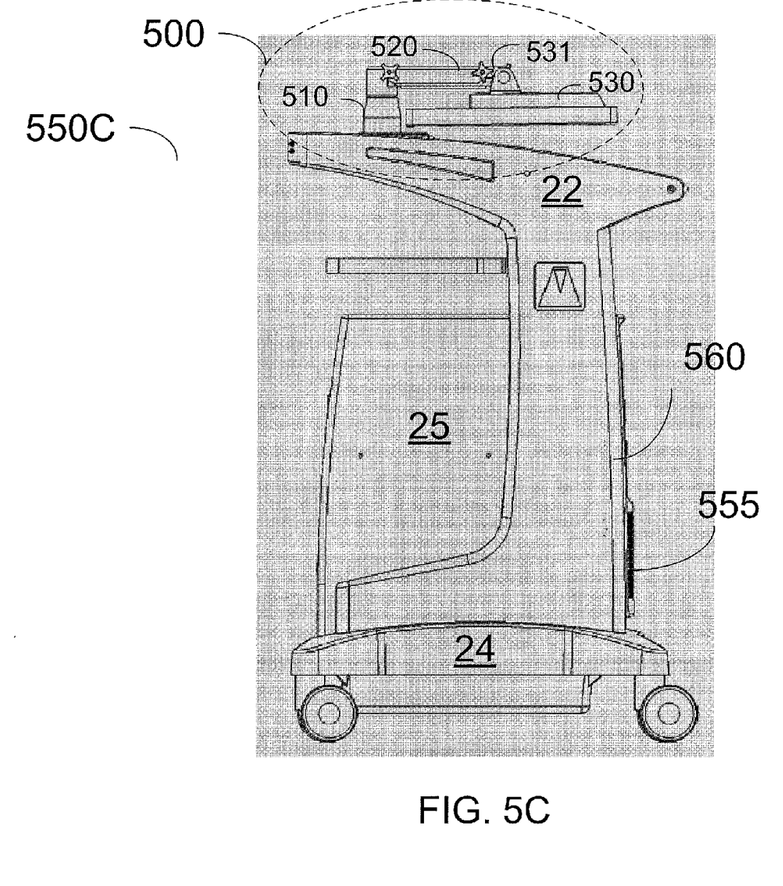
FIG. 5C illustrates a partial view of a monitor support configuration on a rolling cart, according to embodiments disclosed herein.

FIG. 5C illustrates a partial view of a configuration 550C with monitor support 500 on rolling cart 560, according to embodiments disclosed herein. Configuration 550C may include monitor support 500 as in configuration 350C, described in detail above in relation to FIG. 3C.

Figure 6:
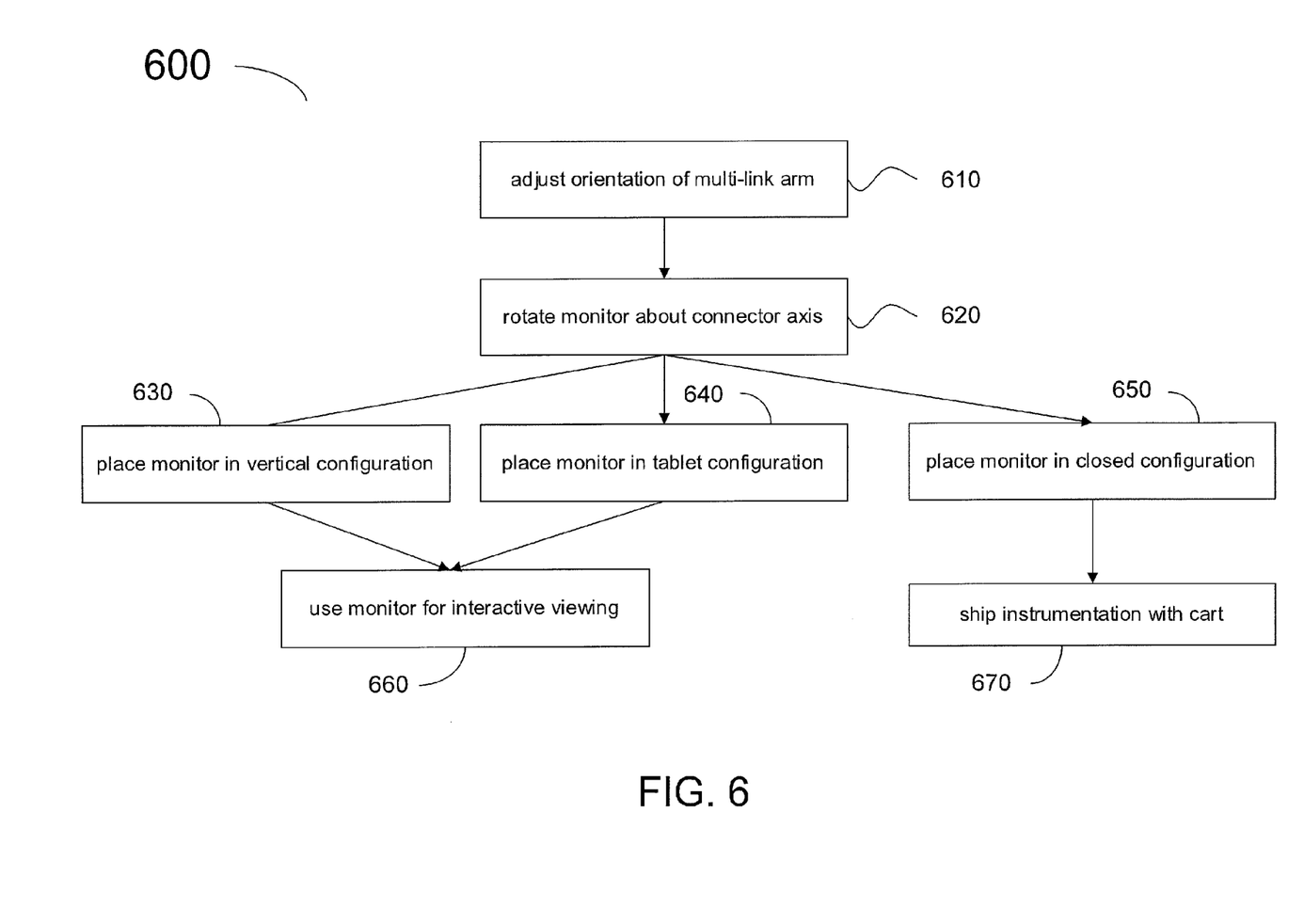
FIG. 6 illustrates a flow chart of a method for using a monitor having a display for instrumentation carried in a cart, according to some embodiments.

FIG. 6 illustrates a flow chart of a method 600 for using a monitor having a display for instrumentation carried in a cart, according to some embodiments. The monitor in method 600 may include a monitor support, such as monitor 130 includes monitor support 100 in FIG. 1. The cart in method 600 may be as cart 460, or cart 560 described in detail in relation to FIGS. 4, and 5A-5C above. The instrumentation may include a desktop portion such as portion 455 or portion 555 described in detail above in relation to FIGS. 4, and 5A-5C. Method 600 may be performed by test personnel in a facility where medical instrumentation is assembled and tested.

Step 610 includes adjusting the orientation of a multi-link arm in a monitor support, the multi-link arm coupling the monitor to a base portion. According to embodiments consistent with the present disclosure, a multi-link arm in 610 may be as multi-link arm 120, multi-link arm 320, multi-link arm 420, or multi-link arm 520 described in detail above in relation to FIGS. 1-5A-5C. Step 620 rotates the monitor about a connector axis in a connector, the connector coupling the monitor to the multi-link arm. For example, the connector and connector axis may be as connector 131 and connector axis 132, or connector 331 and connector axis 332 described in detail above in relation to FIGS. 1 and 3. According to some embodiments, the connector in step 620 remains in a horizontal position while adjusting the multi-link arm, where horizontal is defined with respect to a monitor bottom plate, such as bottom plate 112 (cf. FIG. 1). According to some embodiments, step 610 may include adjusting the angle of the multi-link arm relative to a horizontal plane from about zero degrees to about 90°. The horizontal plane is defined in some embodiments relative to a base portion in the monitor support, as illustrated in FIGS. 1-3, above. In some embodiments, the horizontal plane may be defined by the bottom platform in the cart carrying the instrumentation, such as bottom platform 24 in cart 460 or cart 560 (cf. FIGS. 4 and 5, above).

According to some embodiments, rotating the monitor about the connector axis in step 620 includes rotating the monitor by an angle between zero degrees and about 180°. Further according to some embodiments, method 600 may include setting the monitor in a desired configuration in steps 630, 640, and 650, as follows. In step 630 the monitor is set in a vertical configuration, such that the monitor makes an angle of approximately 90° relative to the connector, which is in a substantially horizontal orientation. In step 640 the monitor is set in a tablet configuration, such that the monitor makes an angle of approximately zero degrees (0°) relative to the connector. In step 650 the monitor is set in a closed configuration, such that the monitor makes an angle of substantially 180° with the connector.

In some embodiments consistent with the present disclosure, step 620 may further include rotating the monitor about a vertical axis. The vertical axis may be defined relative to a base portion in the monitor support. For example, a rotation about a vertical axis performed in step 620 may be as illustrated in FIG. 3D, above. In embodiments of the present disclosure used for medical instrumentation carried in roll-around carts in hospital facilities, a user may desire to rotate the monitor about a vertical axis as described above. This situation arises often when the orientation of the roll-around cart on the bedside of a patient is different from the best position of the user for performing step 660.

In step 660 a user may perform interactive viewing with the monitor. For example, in step 660 a user may press on a touch screen attribute in a display application on the monitor, after step 640. In some embodiments, a user may place the monitor in a configuration close to vertical in step 630, adjusting the precise orientation of the monitor depending on the user height relative to the monitor position, and then perform step 660 for viewing the display on the monitor.

According to some embodiments, in step 670 a user may ship the monitor with the instrumentation and the cart to a distant location after setting the monitor in a closed configuration in step 650.

Embodiments of the invention described above are exemplary only. One skilled in the art may recognize various alternative embodiments from those specifically disclosed. Those alternative embodiments are also intended to be within the scope of this disclosure. As such, the invention is limited only by the following claims.

What is claimed is:

1. A cart for carrying instrumentation including a monitor support, the cart comprising:
   a bottom portion for holding a desktop instrumentation, the bottom portion including wheels for rolling the cart and a casing positioned substantially around the desktop instrumentation;
   a top portion for holding the monitor support, the monitor support comprising:
      a base portion including a handle extending in a direction opposite the casing for pushing the cart, wherein the base portion further includes a top component and a bottom plate, the bottom plate being coupled to the top portion of the cart, wherein the base portion further includes a vertical axis and a pivoting component to allow rotation of the base portion about the vertical axis;
      a monitor coupled to a monitor mount disposed on a side opposite a display side of the monitor;
      a multi-link arm coupling the monitor to the base portion; wherein the multi-link arm comprises:
         a first beam coupled to the base portion by a first pivot;
         a second beam coupled to the base portion by a second pivot, wherein the first and second beams are disposed in a side by side configuration, the first beam and the second beam allowed to have a parallel motion relative to each other as the first beam rotates about the first pivot and the second beam rotates about the second pivot, wherein the first beam and the second beam are coupled to the top component of the base portion such that the multi-link arm is vertically spaced from the top portion, and wherein the first beam and the second beam are coupled to a side of the top component of the base portion such that the first beam and the second beam are offset from the vertical axis, wherein rotation of the first and second beams about the first and second pivots selectively moves the monitor up and down relative to the top portion;
         a connector coupling the monitor mount to the multi-link arm, the connector having a connector axis, the connector enabling a rotation of the monitor by approximately 180° about the connector axis, wherein the connector is coupled to the first beam through a third pivot and to the second beam through a fourth pivot, the third pivot and the fourth pivot being movable relative to one another when the first and second beams are rotated such that the connector is rotatable relative to the first and second beams;
      a spring coupled to a first end of the first beam and a second end of the second beam, wherein the spring is configured to provide a restoring force to maintain the first beam and the second beam in parallel configuration relative to each other as the first beam rotates about the first pivot and the second beam rotates about the second pivot; and
   wherein the monitor is positionable in at least one of a vertical configuration, a tablet configuration, and a closed configuration by selectively restricting rotation of at least one of the first beam, the second beam, and the connector when the first beam, the second beam, and the connector are in a desired orientation.

2. The cart of claim 1 wherein the first beam is rotatable about the first pivot and the second beam is rotatable about the second pivot such that the third pivot and the fourth pivot enable the connector to keep a fixed position relative to the first beam and the second beam.

3. The cart of claim 1 wherein the first beam is able to rotate about the first pivot by an angle from about zero degrees to about 90° and the second beam is able to rotate about the second pivot by an angle from about zero degrees to about 90°.

4. The cart of claim 1 wherein the pivoting component is configured to allow the base portion to rotate about the vertical axis from about zero degrees to about 360°.

5. The cart of claim 1 wherein the spring is disposed in an interior volume of the multilink arm.

6. The cart of claim 1 wherein the bottom plate includes a plurality of fixing elements configured to fasten the base portion to the top portion of the cart.

7. The cart of claim 1 further comprising a first knob disposed adjacent to the first beam, the second beam, and the base portion, and configured to selectively restrict rotation of the first beam and the second beam relative to the base portion.

8. The cart of claim 1 further comprising a second knob disposed adjacent to the first beam, the second beam, and the connector, and configured to selectively restrict rotation of the connector relative to the first beam and the second beam.

9. The cart of claim 1 further comprising a third knob disposed adjacent to the connector and the monitor, and configured to selectively restrict rotation of the monitor about the connector axis.

10. A cart for carrying instrumentation including a monitor support, the cart comprising:
   a bottom portion for holding a desktop instrumentation, the bottom portion including wheels for rolling the cart;
   a top portion for holding the monitor support, the monitor support comprising:
      a base portion including a substantially cylindrical top component and a substantially rectangular bottom plate, the bottom plate being coupled to the top portion of the cart, wherein the base portion further includes a vertical axis and a pivoting component to allow rotation of the base portion about the vertical axis;
      a monitor;
      a multi-link arm coupling the monitor to the base portion; wherein the multi-link arm comprises:
         a first beam coupled to the base portion by a first pivot;
         a second beam coupled to the base portion by a second pivot, wherein the first and second beams are disposed in a side by side configuration, the first beam and the second beam allowed to have a parallel motion relative to each other as the first beam rotates about the first pivot and the second beam rotates about the second pivot, wherein the first beam and the second beam are coupled to the top component of the base portion such that the multi-link arm is vertically spaced from the top portion, and wherein the first beam and the second beam are coupled to a side of the top component of the base portion such that the first beam and the second beam are offset from the vertical axis, and wherein the first pivot and the second pivot define a rotational axis of the multi-link arm that is perpendicular to the vertical axis, wherein rotation of the first and second beams about the rotational axis selectively moves the monitor up and down relative to the top portion;
a connector coupling the monitor to the multi-link arm, the connector having a connector axis, the connector enabling a rotation of the monitor by approximately 180° about the connector axis, wherein the connector axis is parallel to the rotational axis and perpendicular to the vertical axis; and
wherein the first beam and second beam each include a first end and a second end, and wherein the multilink arm includes a spring coupled to the first end of the first beam and the second end of the second beam.

11. A cart for carrying instrumentation including a monitor support, the cart comprising:
a bottom portion for holding a desktop instrumentation, the bottom portion including a frame having first and second parallel spaced vertical portions, the first spaced vertical portion having a first interior surface and the second spaced vertical portion having a second interior surface opposed to the first interior surface, the first and second interior surfaces being spaced apart by a first distance such that the first and second parallel spaced vertical portions are configured to receive the desktop instrumentation therebetween, wherein the bottom portion further includes a casing surrounding the desktop instrumentation disposed between the first and second vertical portions, wherein the bottom portion further includes wheels for rolling the cart;
a top portion for holding the monitor support, the top portion including a handle disposed on a proximal portion and extending in a direction opposite the casing and the support rail, wherein the monitor support is disposed on a distal portion of the top portion, the monitor support comprising:
a base portion including a substantially cylindrical top component and a substantially rectangular bottom plate, the bottom plate being coupled to the top portion of the cart, wherein the base portion further includes a vertical axis and a pivoting component to allow rotation of the base portion about the vertical axis;
a monitor coupled to a monitor mount disposed on a side opposite a display side of the monitor;
a multi-link arm coupling the monitor to the base portion, wherein the multi-link arm comprises:
a first beam and a second beam disposed in a parallel configuration, wherein the first and second beams are disposed in a side by side configuration, the first beam and the second beam each including a first end and a second end, the first end of the first beam coupled to the top component of the base portion by a first pivot and the first end of the second beam coupled to the top component of the base portion by a second pivot, wherein the first ends of the first beam and the second beam are coupled to the top component of the base portion such that the multi-link arm is vertically spaced from the top portion, and wherein the first ends of the first beam and the second beam are coupled to a side of the top component of the base portion such that the first ends of the first beam and the second beam are offset from the vertical axis;
a spring coupled to a first tab disposed at the first end of the first beam and to a second tab disposed at the second end of the second beam such that the spring spans diagonally across the multilink arm, wherein the spring is configured to provide a restoring force to maintain the first beam and the second beam in parallel configuration relative to each other as the first beam rotates about the first pivot and the second beam rotates about the second pivot, wherein the first pivot and the second pivot define a first rotational axis of the multi-link arm that is perpendicular to the vertical axis, wherein rotation of the first and second beams about the first rotational axis selectively moves the monitor up and down relative to the top portion; and
a connector coupling the monitor to the multi-link arm, the connector being coupled to the second end of the first beam by a third pivot and coupled to the second end of the second beam by a fourth pivot, wherein the third pivot and the fourth pivot are independent of the first pivot and the second pivot such that the relative positioning of the connector, the first beam, and the second beam remain the same during rotation of the first beam about the first pivot and the second beam about the second pivot, and wherein the connector is coupled to the monitor mount such that the connector defines a connector axis about which the monitor mount is rotatable, the connector enabling a rotation of the monitor by approximately 180° about the connector axis, the third pivot and the fourth pivot being movable relative to one another when the first and second beams are rotated such that the connector is rotatable relative to the first and second beams, wherein the third and fourth pivot define a second rotational axis that is parallel to the first rotational axis and perpendicular to the vertical axis, wherein the connector axis is parallel to the first and second rotational axes and perpendicular to the vertical axis;
wherein the first beam, the second beam, and the connector are positionable in a desired orientation by selective rotation about the first and second rotational axes and the connector axis such that the monitor achieves least one of a vertical configuration, a tablet configuration, and a closed configuration in which the display side of the monitor is facing the top portion when the rotation of the first beam, the second beam, and the connector is selectively restricted.

* * * * *